(12) United States Patent
Shamis et al.

(10) Patent No.: US 9,824,092 B2
(45) Date of Patent: Nov. 21, 2017

(54) FILE STORAGE SYSTEM INCLUDING TIERS

(71) Applicant: Microsoft Technology Licensing, LLC, Redmond, WA (US)

(72) Inventors: Alex Shamis, Redmond, WA (US); Edmund Nightingale, Redmond, WA (US); Mugdha Jamsandekar, Redmond, WA (US); Pavan Edara, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 14/741,154

(22) Filed: Jun. 16, 2015

(65) Prior Publication Data

US 2016/0371291 A1 Dec. 22, 2016

(51) Int. Cl.
*G06F 17/30* (2006.01)

(52) U.S. Cl.
CPC .... *G06F 17/30153* (2013.01); *G06F 17/3033* (2013.01); *G06F 17/30097* (2013.01); *G06F 17/30132* (2013.01); *G06F 17/30292* (2013.01); *G06F 17/30589* (2013.01)

(58) Field of Classification Search
USPC ........................................................ 707/693
See application file for complete search history.

(56) References Cited

U.S. PATENT DOCUMENTS

| | | | |
|---|---|---|---|
| 5,893,086 A * | 4/1999 | Schmuck | G06F 11/1435 |
| 6,658,625 B1 | 12/2003 | Allen | |
| 7,873,619 B1 | 1/2011 | Faibish et al. | |
| 8,219,524 B2 * | 7/2012 | Gokhale | G06F 17/30902 707/610 |
| 8,463,825 B1 | 6/2013 | Harty et al. | |
| 8,935,487 B2 * | 1/2015 | Sengupta | G06F 12/0862 707/692 |
| 9,043,334 B2 * | 5/2015 | Chiueh | G06F 17/30097 707/747 |
| 2010/0199036 A1 | 8/2010 | Siewert et al. | |
| 2011/0106862 A1 | 5/2011 | Mamidi et al. | |
| 2011/0246491 A1 | 10/2011 | Clash et al. | |
| 2013/0117515 A1 | 5/2013 | Ashmore et al. | |
| 2013/0275653 A1 | 10/2013 | Ranade et al. | |

(Continued)

FOREIGN PATENT DOCUMENTS

WO 2012158514 A1 11/2012

OTHER PUBLICATIONS

"Second Written Opinion Issued in PCT Application No. PCT/US2016/037458", dated May 16, 2017, 10 Pages.

(Continued)

*Primary Examiner* — Cam-Linh Nguyen
(74) *Attorney, Agent, or Firm* — Shook, Hardy & Bacon L.L.P.

(57) ABSTRACT

Data storage systems and processes are provided including processes for handling write and read requests to a storage system. A storage system can include data stores, such as a log store, a hash store and a journal store. Data can be written to a log store, a log store can be converted to a hash store, and hash stores can be merged into a journal store. A storage system can use optimizations in writing and storing data, to provide lower latency, lower levels of write amplification and higher throughput.

18 Claims, 10 Drawing Sheets

(56) References Cited

U.S. PATENT DOCUMENTS

2014/0089273 A1  3/2014  Borshack et al.
2014/0095775 A1  4/2014  Talagala et al.

OTHER PUBLICATIONS

Anand, et al., "Cheap and Large CAMs for High Performance Data-Intensive Networked Systems", In Proceedings of the 7th USENIX Conference on Networked Systems Design and Implementation, Apr. 28, 2010, 16 pages.
Andersen, et al., "FAWN: A Fast Array of Wimpy Nodes", In Proceedings of the ACM SIGOPS 22nd Symposium on Operating Systems Principles, Oct. 11, 2009, 14 pages.
Andersson, et al., "Improved Behaviour of Tries by Adaptive Branching", In Journal of Information Processing Letters, vol. 46, Issue 6, Jul. 26, 1993, 8 pages.
Badam, et al., "HashCache: Cache Storage for the Next Billion", In Proceedings of the 6th USENIX Symposium on Networked Systems Design and Implementation, Apr. 22, 2009, 14 pages.
Balakrishnan, et al., "Differential RAID: Rethinking RAID for SSD Reliability", In Proceedings of the 5th European Conference on Computer Systems, Apr. 13, 2010, pp. 15-26.
"Oracle Berkeley DB 12c", Retrieved on: Aug. 5, 2014, Available at: http://www.oracle.com/technetwork/database/database-technologies/berkeleydb/overview/index.html.
Beaver, et al., "Finding a Needle in Haystack: Facebook's Photo Storage", In Proceedings of the 9th USENIX Conference on Operating Systems Design and Implementation, Oct. 4, 2010, 14 pages.
Belazzougui, et al., "Theory and Practise of Monotone Minimal Perfect Hashing", In Proceedings of the Eleventh Workshop an Algorithm Engineering and Experiments, Jan. 3, 2009, pp. 132-144.
Belazzougui, et al., "Monotone Minimal Perfect Hashing: Searching a Sorted Table with O(1) Accesses", In Proceedings of the Twentieth Annual ACM-SIAM Symposium on Discrete Algorithms, Jan. 4, 2009, pp. 785-794.
Belazzougui, et al., "Hash, Displace, and Compress", In Proceedings of the 17th European Symposium on Algorithms, Sep. 7, 2009, 17 pages.
Blandford, et al., "An Experimental Analysis of a Compact Graph Representation", In Proceedings of Sixth Workshop an Algorithm Engineering and Experiments, Jan. 10, 2004, 13 pages.
Bloom, Burton H., "Space/Time Trade-Offs in Hash Coding with Allowable Errors", In Communications of the ACM, vol. 13, Issue 7, Jul. 1, 1970, pp. 422-426.
Botelho, et al., "Minimal Perfect Hashing: A Competitive Method for Indexing Internal Memory", In Journal Information Sciences, vol. 181, Issue 13, Jul. 1, 2011, pp. 2608-2625.
Chang, et al., "Bigtable: A Distributed Storage System for Structured Data", In Proceedings of 7th Symposium on Operating Systems Design and Implementation, Nov. 6, 2006, 14 pages.
Chang, Li-Pin, "On Efficient wear Leveling for Large-Scale Flash-Memory Storage Systems", In Proceedings of the ACM Symposium on Applied Computing, Mar. 11, 2007, pp. 1126-1130.
Clark, David, "Compact Pat Trees", In PhD. Thesis, Retrieved on: Aug. 5, 2014, 126 pages.
Cooper, et al., "Benchmarking Cloud Serving Systems with YCSB", In Proceedings of the 1st ACM Symposium on Cloud Computing, Jun. 10, 2010, pp. 143-154.
Dabek, et al., "Wide-Area Cooperative Storage with CFS", In Proceedings of the Eighteenth ACM Symposium on Operating Systems Principles, Oct. 21, 2001, pp. 202-215.
Debnath, et al., "FlashStore: High Throughput Persistent Key-Value Store", In Proceedings of the VLDB Endowment, vol. 3 Issue 1-2, Sep. 1, 2010, pp. 1414-1425.
Debnath, et al., "SkimpyStash: RAM Space Skimpy Key-Value Store on Flash-Based Storage", In Proceedings of the ACM SIGMOD International Conference on Management of Data, Jun. 12, 2011, pp. 25-36.

Decandia, et al., "Dynamo: Amazon's Highly Available Key-Value Store", In Proceedings of Twenty-First ACM SIGOPS Symposium on Operating Systems Principles, Oct. 14, 2007, pp. 205-220.
Dong, et al., "Applying Approximate Order Dependency to Reduce Indexing Space", In Proceedings of the ACM SIGMOD International Conference on Management of Data, Jun. 2, 1982, pp. 119-127.
Elias, Peter, "Universal Codeword Sets and Representations of the Integers", In Proceedings of IEEE Transactions on Information Theory, vol. 21, Issue 2, Mar. 1975, 10 pages.
Erlingsson, et al., "A Cool and Practical Alternative to Traditional Hash Tables", In Proceedings of 7th Workshop on Distributed Data and Structures, Jan. 2006, pp. 1-6.
"Facebook", Retrieved on: Aug. 5, 2014 Available at: http://www.facebook.com/.
"Flickr", Retrieved on: Aug. 5, 2014 Available at: http://www.flickr.com/.
Fox, et al., "Practical Minimal Perfect Hash Functions for Large Databases", In Communications of the ACM, vol. 35, Issue 1, Jan. 1992, pp. 105-121.
"LevelDB", Retrieved on: Aug. 5, 2014 Available at: https://code.google.com/p/leveldb/.
Mammarella, et al., "Modular Data Storage with Anvil", In Proceedings of the ACM SIGOPS 22nd Symposium on Operating Systems Principles, Oct. 11, 2009, 14 pages.
"Memcached", Retrieved on: Aug. 5, 2014 Available at: http://www.danga.com/memcached/.
Nath, et al., "Online Maintenance of Very Large Random Samples on Flash Storage", In Proceedings of the 34th International Conference on Very Large Data Bases, Aug. 23, 2008, pp. 970-983.
Nath, et al., "FlashDB: Dynamic Self-Tuning Database for NAND Flash", In Proceedings of the 6th International Conference on Information Processing in Sensor Networks, Apr. 25, 2007, 10 pages.
"Ordinal Technology—NSort", Retrieved on: Aug. 5, 2014 Available at: http://www.ordinal.com/.
Pagh, et al., "Cuckoo Hashing", In Journal of Algorithms, vol. 51 Issue 2, May 2004, pp. 122-144.
Polte, et al., "Enabling Enterprise Solid State Disks Performance", In Proceedings of 1st Workshop on Integrating Solid-state Memory into the Storage Hierarchy, Mar. 7, 2009, 8 pages.
Quinlan, et al., "Venti: A New Approach to Archival Storage", In Proceedings of the 1st USENIX Conference on File and Storage Technologies, Jan. 30, 2002, 13 pages.
Stoica, et al., "Chord: A Scalable Peer-to-Peer Lookup Service for Internet Applications", In Proceedings of the Conference on Applications, Technologies, Architectures, and Protocols for Computer Communications, Aug. 27, 2001, 12 pages.
"Twitter", Retrieved on: Aug. 5, 2014 Available at: http://www.twitter.com/.
Wilson, et al., "Dynamic Storage Allocation: A Survey and Critical Review", In Proceedings of the International Workshop on Memory Management, Sep. 27, 1995, 78 pages.
Zeinalipour-Yazti, et al., "MicroHash: An Efficient Index Structure for Flash-Based Sensor Devices", In Proceedings of 4th USENIX Conference on File and Storage Technologies, Dec. 13, 2005, 14 pages.
Lim, et al., "SILT: A Memory-Efficient, High-Performance Key-Value Store", In Proceedings of the Twenty-Third ACM Symposium on Operating Systems Principles, Oct. 23, 2011, pp. 1-13.
Anandy, et al., "Design Patterns for Tunable and Efficient SSD-based Indexes", Retrieved on: Jul. 31, 2014 Available at: http://instartlogic.com/resources/research_papers/aanand tunable_efficient_ssd_indexes.pdf.
Spillane, et al., "An Efficient Multi-Tier Tablet Server Storage Architecture", In Proceedings of the 2nd ACM Symposium on Cloud Computing, Oct. 27, 2011, 14 pages.
Li, Zhichao, "GreenDM: A Versatile Tiering Hybrid Drive for the Trade-Off Evaluation of Performance, Energy, and Endurance", In Technical Report FSL-14-01, May 2014, 119 pages.
Appuswamy, et al., "Integrating flash-based SSDs into the storage stack", In Proceedings of IEEE 28th Symposium on Mass Storage Systems and Technologies, Apr. 16, 2012, 17 pages.

(56) References Cited

OTHER PUBLICATIONS

Hwang, Joo-Young, "Flash-Friendly File System (F2FS)", Published on: Feb. 22, 2013 Available at: http://elinux.org/images/1/12/Elc2013_Hwang.pdf.

Helland, "Cosmos—Big Data and Big Challenges," Retrieved on Jun. 16, 2015, Available at: http://research.microsoft.com/en-us/events/fs2011/helland_cosmos_big_data_and_big_challenges.pdf.

Eliot, "Microsoft Cosmos: Petabytes perfectly processed perfunctorily," Retrieved on: Jun. 16, 2015, Available at: http://blogs.msdn.com/b/seliot/archive/2010/11/05/cosmos-petabytes-perfectly-processed-perfunctorily.aspx.

"International Search Report and Written Opinion Issued in PCT Application No. PCT/US2016/037458", dated Nov. 21, 2016, 28 Pages.

"Data compaction", Retrieved From <<https://en.wikipedia.org/w/index.php?title=Data_compaction&oldid=580834885>>, Nov. 9, 2013, 1 Page.

"Hash Function", Retrieved From <<https://en.wikipedia.org/w/index.php?title=Hash_function&oldid=666518313>>, Jun. 11, 2015, 12 Pages.

DSIMIC: "Linux Logical Volume Manager", Retrieved From <<https://en.wikipedia.org/w/index.php?title=Logical_volume_management&oldid=667045290>>, Jun. 15, 2015, 3 Pages.

Matthiaspaul: "Block (Data Storage)—Wikipedia", Retrieved From <<https://en.wikipedia.org/w/index.php?title=Block_(datastorage)&oldid=655739849>>, Apr. 9, 2015, 2 Pages.

Snuggums: "Zip (file format)", Retrieved From <<https://en.wikipedia.org/w/index.php?title=Zip_(file format)&oldid=660072337>>, Apr. 30, 2015, 8 Pages.

DSIMIC: "Solid-State Drive", Retrieved From <<https://en.wikipedia.org/w/index.php?title=Solid-state_drive&oldid=666580687>>, Jun. 12, 2015, 30 Pages.

"International Preliminary Report on Patentability Issued in PCT Application No. PCT/US2016/037458", dated Aug. 17, 2017, 12 Pages.

* cited by examiner

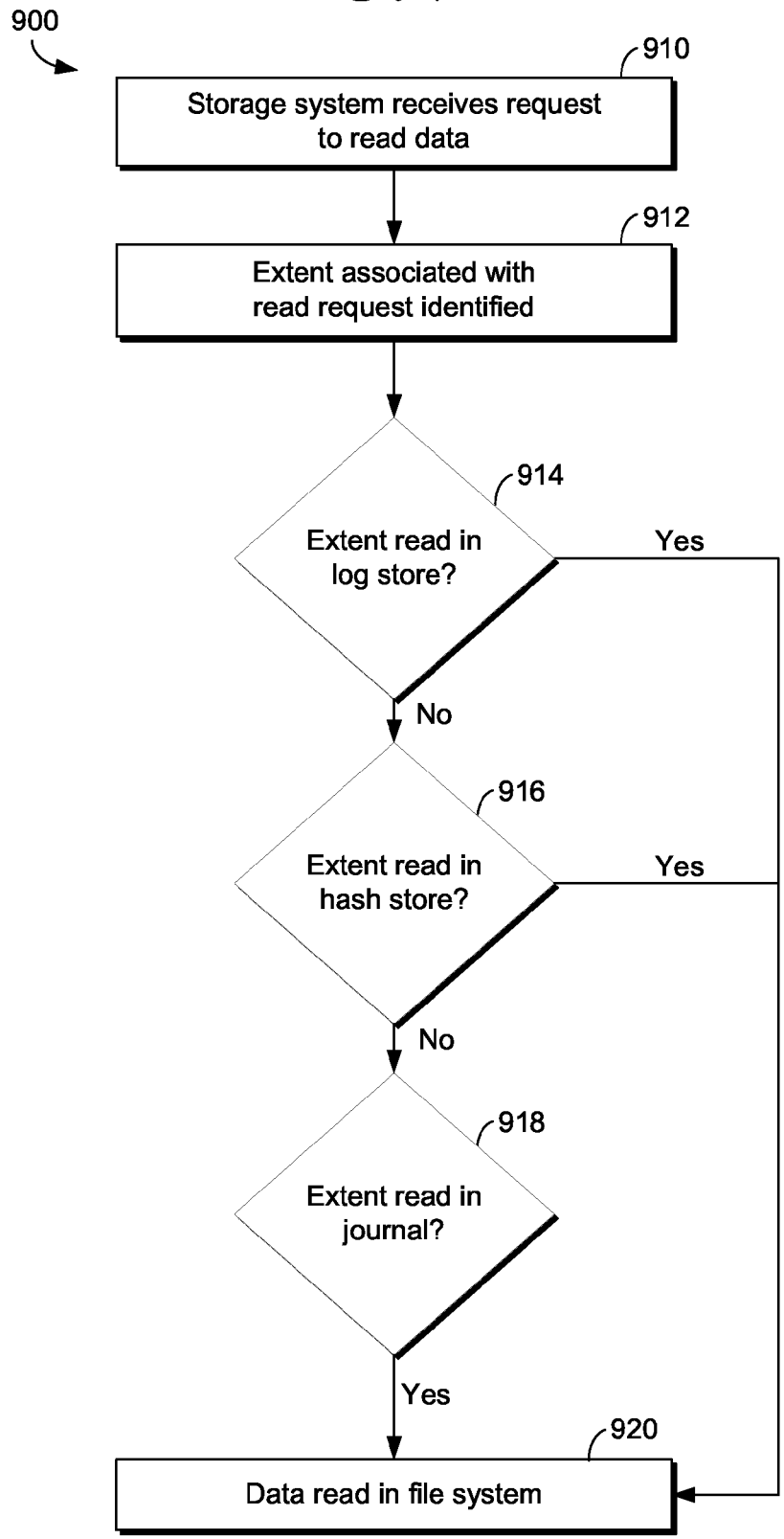

FILE STORAGE SYSTEM INCLUDING TIERS

BACKGROUND

In computing systems with data storage needs, storage systems can be implemented to store data. Data can be written to in various formats in storage systems. In some cases, storage systems are associated with data stores, which can be implemented using nonvolatile memory, such as solid state storage devices, or SSD devices. Requests to read or write data can be received by a storage system. In some cases, storage systems are associated with devices that demonstrate relatively higher latency, such as longer delays to read information written or being written to the system, or relatively higher write amplification, for example writing more instances of data than necessary or writing multiples of data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described in connection with certain aspects below, multi-tiered storage systems are provided, such as a storage system including multiple, logical data storage levels. Aspects include generating data stores in storage systems, for example a log store, a hash store and a journal, along with a manager, in some cases. APIs can be publicly-exposed to allow reads or appends to a storage system.

BRIEF DESCRIPTION OF THE DRAWINGS

The present invention is described in detail below with reference to the attached drawing figures, wherein:

FIG. 9 is a flow diagram of showing aspects of an application programming interface according to an aspect.

DETAILED DESCRIPTION

Figure 1A:
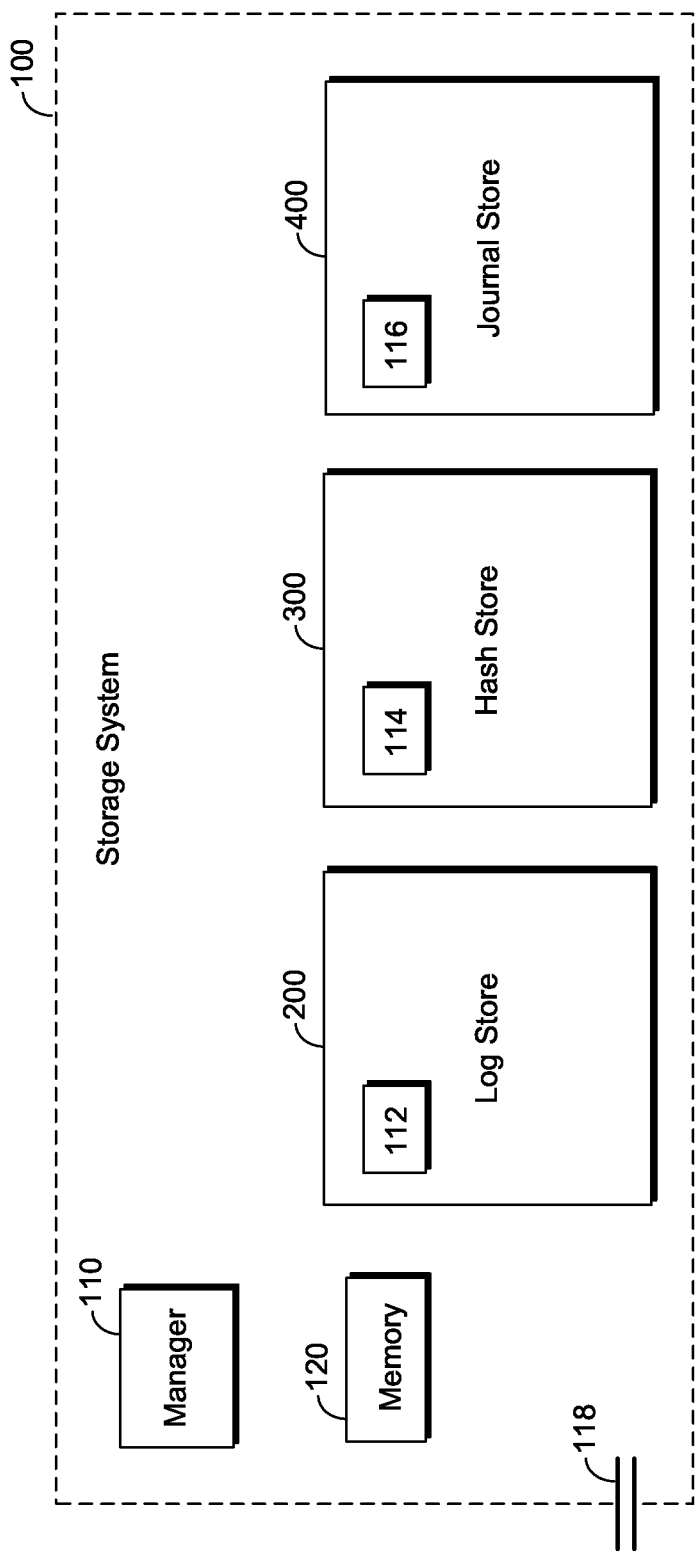
FIG. 1A is a diagram of an illustrative operating environment of a storage system according to an aspect.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects of the invention improve the operation of computers and computer storage by reducing the amount of time it takes to store and retrieve data. Various storage systems are described below, including storage systems with various data stores. One data store in storage system 100 can be referred to as a log store, which can store data in storage system 100 before it is copied or moved to other data stores in storage system 100. Another data store in storage system 100 can be referred to as a hash store, based on the rewriting of one or more log stores in file system 100. Another data store can be referred to as a journal or journal store, based on the rewriting of one or more hash stores in file system 100. Data stores can be generational or hierarchical, including aspects where data is first part of a log store, rewritten to a hash store, and/or rewritten to a journal store, for example as compaction processes occur in a storage system.

As described below, storage system 100 includes multiple stores of data, such as a log store 200, hash store 300, and journal store 400. In aspects, storage system 100 generates a log store 200, a hash store 300 and a journal store 400. Each data store (log store 200, hash store 300, journal store 400) is a logical store or level of data in storage system 100. Data stores can include instances of data written in specific file formats. In some cases, instances of data are written to one or more extent stores, which accept written data and provide storage in association with various memory or storage devices or containers.

Storage systems can utilize nonvolatile memory, such as solid state drives (SSD), for storage of information, for example as physical storage devices or containers associated with one or more extent stores. Nonvolatile memory can include devices, without limitation, such as SSD systems, flash devices (NAND or NOR) or EEPROM devices. A storage system can interact with physical storage containers such as storage devices or components, including one or more hard disk drives, and servers or other components capable of requesting information to be read from or written to storage, including communications with programs, applications or application programming interfaces (APIs). For example, internal or backend data may be stored using a storage system, such as storage system 100 described below. In some aspects, programs or applications, including third-party applications and distributed and/or cloud-based applications, can use web-based functionality and/or publicly-available APIs to read from or write to a storage system.

A storage system may be considered to be higher or better performing if it provides faster reading or writing, lower levels of latency and/or reductions in write amplification. Methods disclosed here include a storage system providing lower levels of wear and/or lower-latency associated with reading and/or writing to one or more storage devices associated with the storage system. Additionally, lower latency or delay, and minimized write amplification, can be caused by implementing storage systems such as those described below, along with higher throughput, for example higher and/or faster levels of processing writes and/or reads by the system.

Write amplification can occur during random write operations, where extra or multiple instances of writing may occur (for example, when an underlying flash translation layer forces more than one write to occur to NAND flash during a write operation from an application or a storage system). In some cases, performing one write operation forces a storage system or driver to execute more than one write operation, due to the underlying storage media, causing more write operations than intended.

As described below, in aspects, write operations are performed sequentially at the end of a data store in memory, or after the previous write operation. For example, writes can be made to a log store 200 in a storage system 100, sequentially after the previous write, so that write operations are minimized or optimized, and/or the time required to perform the necessary write operations is minimized. The fewer write operations required over time can lead to less or slower wear on an associated storage device or device, such as an SSD, which may be known or designed to tolerate a certain number of write operations (per byte or block of storage space). In some cases, two or more devices are written to alternately.

The exemplary storage systems described herein can provide lower response times for reading data, for example from one or more storage devices associated with a storage system, such as storage device 122. Storage systems can also lower the amount of write operations and/or write amplifications, reduce wear, and/or lower the amount of time necessary to write data to a storage system. In some cases, the number of times a byte on a particular storage device associated with storage system 100 can be written to reliably may be referred to as endurance. The speed of read and/or write operations may be referred to as the performance of one or more storage devices associated with a storage system, such as one or more SSDs.

Storage systems in accordance with aspects described below can increase the endurance and/or performance of storage devices associated with the storage system. Aspects described below can optimize operations, such as write operations, to reduce write amplification and therefore extend the lifetime of devices by minimizing wear, without sacrificing, or while achieving, relatively high performance. Aspects described below can be used or optimized based on storage systems requiring higher performance or higher/longer endurance.

Multiple data stores (such as log store 200, hash store 300, journal store 400) may appear to the user during operation as one data storage system, such as storage system 100. An API, such as the example described below, can be used to read data from data store in storage system 100, including data stores associated with one or more storage devices, while appearing as a single read operation to a user or system. The exemplary systems described below can lower the response time of reading data or content from storage system 100, lower the amount or write operations or write amplifications thereby reducing wear, and/or lower the amount of time necessary to write data.

FIG. 1A shows an exemplary operating environment for aspects of the invention described herein. Storage system 100 can include manager 110, link 118 and memory 120. In an aspect, storage system 100 includes multiple levels or stores of data, such as log store 200, hash store 300, and journal store 400, each with one controller, for example control units 112, 114, 116. Memory 120 or aspects of memory 120 in a storage system 100 can be associated with storage system 100 and/or each data store. A control unit, such as control unit 112, is representative of control over data in storage system 100 and can comprise one or more components or sub-units and/or aspects of manager 110. In aspects, manager 110 includes one or more control units 112, 114, 116 associated with one or more data instances in storage system 100.

A manager 110 can be configured to coordinate write operations to portions of storage system 100, for example to log store 200, in some cases by passing write requests to log store 200. Manager 110 broadly refers to any software, or portions of software, that runs on top of, and/or accesses, aspects of storage system 100. Manager 110 can be implemented using an embedded or onboard local processor and/or firmware. Manager 110 can be coupled to, or in communication with, log store 200, hash store 300, data store 400, and memory 120, in aspects, including detecting or determining conditions associated with data stores and/or acting based on determinations made by storage system 100.

Figure 2:
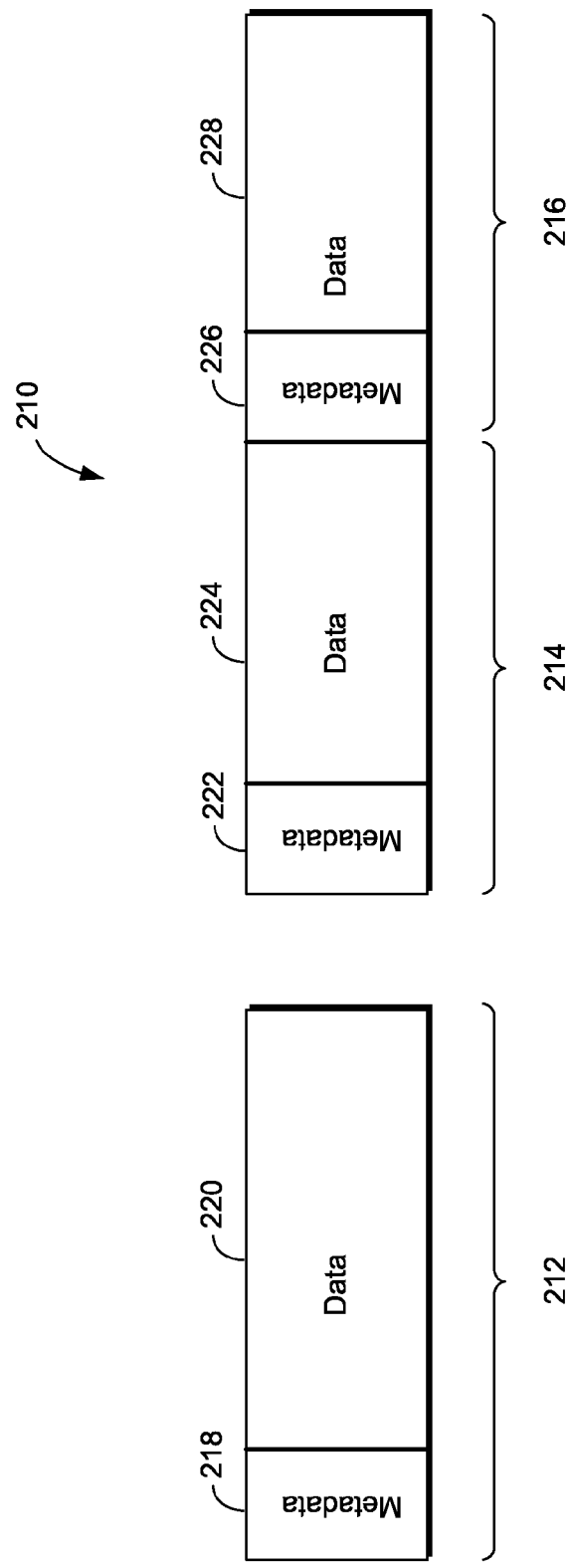
FIG. 2 is a diagram of aspects of a log store of a storage system according to an aspect.

In aspects, log store 200 includes multiple data instances, each including a metadata portion and a data portion, as described below with respect to FIG. 2. Hash store 300 can be generated based on one or more log stores 200. As described with respect to FIG. 3, hash store 300 can be a single file having a header, a hash, a hash metadata portion, and a hash data portion. Journal store 400, discussed with respect to FIG. 4, can be generated based on multiple hash stores 300. In aspects, journal store 400 uses a file format including an journal index portion and journal data portion, and the journal index portion comprising hash metadata portions having offsets that point to corresponding journal data portions. In aspects, a journal index portion is one file and a journal data portion includes one or more separate files.

In some cases, storage system 100 uses keys, such as specific numbers or values, to represent pieces of data stored in storage system 100. For example, a certain piece of data may have a key, such as the value "20," which is used as a mechanism for looking up the data. When an application or program requests a certain key, including requests caused by user actions, the key is translated to an offset, allowing a single read operation to read the correct data. In some aspects, a hash table (or an in-memory representation of a hash table) translates the key. In some cases, this allows one computation, and/or one access to a storage device associated with a data store, to read requested data from storage system 100. A log store 200 and a hash store 300 can have an in-memory hash table, such as a cuckoo hash table, in aspects. In a log store 200, metadata can be stored in a value portion pointing to associated data, with no corresponding value in an in-memory hash table, for example.

Examples described below have three data stores (or more), but give the appearance or functionality of a single storage system 100. For example, APIs can be exposed and used to interact with log store 200, hash store 300 and journal store 400. An overall configuration of storage system 100, or the functionality or optimization of each data store (whether caused or implemented by a manager 110 or not) can be carried out by one or more control units. Each data store can have a controller or control unit, or multiple controllers or control units at various levels.

A storage system such as storage system 100 receives data received through any link or bus (e.g., link 118 in FIG. 1A) or I/O port in aspects, including a PCI Express bus, a direct bus associated with a motherboard, inputs from raw flash memory or flash translation, or other links or connections for receiving data. A server, processor or other device can communicate read or write requests to storage system 100 using link 118, and link 118 can couple or link programs, applications and APIs to storage system 100, in some cases to allow the exemplary API described below to read data from one or more data stores (log store 200, hash store 300, journal store 400) of storage system 100. Storage system 100 includes memory 120 in aspects, and it can include aspects where memory 120 is distributed or divided among the data stores and where one or more buffers exist in memory associated with log store 200, hash store 300, and/or journal store 400.

Figure 1B:
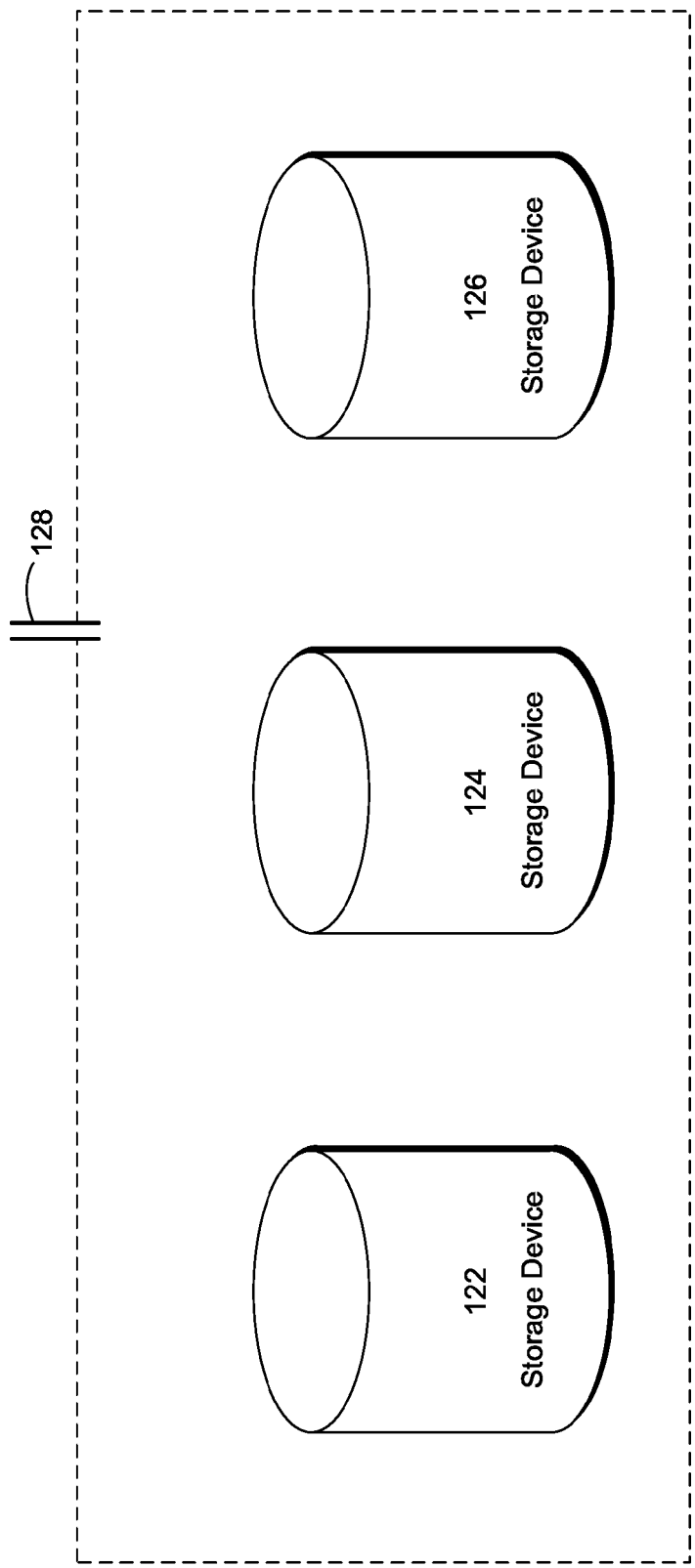
FIG. 1B is a diagram of aspects of a storage system.

As shown in FIG. 1B, storage devices 122, 124, 126 represent one or more nonvolatile memory components used in association storage system 100. Storage devices associated with storage system 100 can include on or more SSDs or other nonvolatile storage devices. An active log store 200 can receive data that is written to an extent store, for example an extent store associated with one or more storage devices (e.g., storage device 122), in one aspect. Any combination of storage devices (such as storage devices 122, 124, 126) can be associated with data written to one or more of the log store 200, hash store 300 and journal store 400. In some cases, one or more distributed storage devices can be associated with storage system 100. The exemplary storage devices 122, 124, 126 are shown for illustrative purposes, and any number of storage devices, or one storage device 122, can be associated with one or more extent stores of file system 100. In an aspect, each journal store 400 in file system 100 is associated with one storage device, such as storage device 126, which, for example, is an SSD.

Storage system 100 can communicate with storage devices 122, 124, 126 through any communications channel or link, such as link 128, suitable for communications between processes, components and/or memory 120 of storage system 100 and storage devices 122, 124, 126. Storage devices 122, 124, 126 are merely exemplary storage devices. In aspects, more than one of storage devices 122, 124, 126 is associated with a link, such as link 128, for receiving and sending information. In aspects, a log store 200 data instance, hash store 300 data instance, and journal store 400 data instance are written as append blocks in a compressed format into an extent store associated with one or more physical storage containers, such as storage device 122, where the append blocks in compressed format are associated with corresponding logical uncompressed sizes.

A program or application receives a request to append data, in an aspect, and the data is written to log store 200. For example, if log store 200 reaches a capacity or threshold limit of data, log store 200 can be transformed into a hash store 300. In aspects, log store 200 is determined to be full by storage system 100. Storage system 100 can determine that log store 200 is not active, and storage system 100 can determine that log store 200 is not receiving write requests. A new log store can be generated in file system 100, then compaction of the initial log store 200 can occur, in some cases. Data from log store 200 is rewritten to hash store 300, in some cases at the direction of manager 100. In this case, data is rewritten from one level or store of data storage to another store. The conversion or rewriting of log store 200 to an instance of hash store 300 may be referred to as minor compaction.

As stated above and described below, aspects of the invention can use various data stores but give the appearance or functionality of a single storage system. In an example, a single read unit could be associated with multiple data stores. An API uses an identifier of a data block or data portion and an associated key value to obtain an offset, which allows a user to insert or retrieve data in any of the three data stores 200, 300, 400. Storage system 100 receives requests to read data from data stores 200, 300, 400, and a key value store handles curation of the data in the tiers or levels of data storage. An API that allows reads on data in storage system 100, across one or more data stores 200, 300, 400, may be referred to as a unifying API. In some cases, use of multiple data stores, such as log store 200, hash store 300 and/or journal store 400 (or multiple hash store instances within a hash store 300) at a time by storage system 100 can return data faster in response to a request for data by a program or application. APIs that allow write operations to storage system 100 can be append-only APIs capable of adding data, or storage system 100 (through manager 110, for example) can implement write operations as append-only operation to log store 200, as described below. An example of one or more APIs that can be publicly-exposed is shown below:

Read(Id, StartReadOffset, EndReadOffset)
Append(Id, Data)
Delete(Id)
Enumerate( )

Log Store

One data store in storage system 100, in an aspect, is a log store 200. FIG. 2 shows a representation 210 of an aspect of log store 200. In an example described herein, the log store 200 is a level of storage in storage system 100. In the log store 200, data is written in one or more blocks, such as block 212 in FIG. 2. In aspects, a log store 200 component comprises a log-based storage system. Information or content can be written to log store 200 in multiple blocks, such as blocks 214, 216. Log store 200 writes without being constrained by the block to which the data belongs. A block can be any size and in some cases, the size of a block is based on a hardware device's specifications, for example to match a write block of an SSD. Log store 200 can be a write-ahead log, where writing may occur quickly, but more memory resources are required to track locations of data on one or more storage devices associated with file system 100, such as flash storage. Aspects of a hash store 300 and a journal store 400, described below, can reduce in-memory requirements of data storage but may require more reads from one or more storage devices, such as flash storage, to locate data.

In aspects, writing is done in amounts, or chunks, that will occupy or be the size of one block, such as an erase block in an example. In aspects, writing is done in amounts that are proportional to the size of one block, such as an erase block, for example by occupying approximately one erase block, two erase blocks, or another number of erase blocks. An erase block can comprise, for example, one or more data blocks or extents, which in turn comprise one or more blocks (in some cases the smallest unit of allocation erased at one time by a storage device or system). For example, one or more storage devices (e.g., storage device 122) can be associated storage system 100. The precise sizes of blocks and/or erase blocks in a system can vary based on partition size(s) and/or the configuration of a system. In some cases, an extent can be equivalent to the block size that can be appended to log store 200, or an append block, or an extent can be equivalent to the current or active append block for write operations in log store 200. The specific size of a data block or erase block is not required to carry out aspects of the invention described herein, and may be affected by storage device considerations. In aspects of the invention, if data does not match an erase-block size or is not proportional to a block size, such as erase block size, a portion of an erase block can be left blank or empty to enable the next write to occur at the beginning of another erase block.

Write operations are performed in at least the size of a write block, such as 4 kilobytes, in one example, while an erase block can be 256 kilobytes. In some storage devices associated with storage systems, such as storage device 122, an entire erase block may be written again to add one byte or one write block, while aspects described herein can add new write operations sequentially to log store 200, including edits or deletions to existing data, without rewriting entire blocks in log store 200. The order can be sequential, such as the order the operations are received or requested, or the order can be based on the order of the set of write operations in a way that allows for some degree of grouping or sorting or pending write operations, for example to write a higher proportion of data in block sizes based on the size (or proportional to the size) of an erase block associated with a storage device.

When a program, application or API causes or performs writes of any size or arbitrary sizes, more wear can result on storage devices associated with a storage system, such as storage system 100. Various methods or approaches can be used, some of which are referred to as wear-leveling, to decrease wear. A controller or manager 110 of storage system 100 can organize or identify data that is to be written as blocks (such as data blocks, described below) into amounts that will comprise one or more erase blocks, either before or as the data is written to an extent store associated with one or more storage devices. In some aspects, write requests or commands can be delayed or grouped in order to increase or optimize the amount of whole erase-block increments used to write log store 200 to an extent store. For example, writes associated with a data store, such as log store 200, can be done according to approaches to the "knapsack" problem, for example where the system uses or attempts to use the highest number of data blocks per erase block, to optimize the storage of data in log store 200.

A log store 200 (or other data stores described herein) can be associated with one or more storage devices, for example storage devices 122, 124, 126 in FIG. 1B. Each block (e.g., block 212) in log store 200 shown in FIG. 2 includes metadata (e.g., metadata 218) and data (e.g., data 220). Additional block 214 includes metadata 222 and data 224, and another block 216 includes metadata 226 and data 228, up to any number of blocks in log store 200.

An in-memory aspect of log store 200 can include the in-memory representation of the data in log store 200, which can allow for read operations to be performed on one or more log sores 200. A hash is used to locate data, such as a cuckoo hash or a hopscotch hash, in some aspects. Any hash can be used with the ability to look-up data. Additionally, a cuckoo hash can add new data with some level of complexity, such as data with 0(1) or constant-time complexity. A hopscotch hash or other hash(es) with read and write capabilities can be used. On start-up, a log store such as log store 200 can be re-read and the cuckoo hash can be repopulated.

A log store, such as log store 200, maintains offsets for each block, which can include storing offsets. An offset can point to or identify a location of data in memory, for example where to read particular data. Log store 200 maintains data within one data unit in insertion order. Offsets used to locate the last-stored or written data, or to read data, can be configured according to the characteristics of one or more solid state drives, embedded programming and/or firmware.

Aspects of the invention handle data values that vary in length and/or grow over time. For example, in an append-only storage system, data can be added to the end or to the most-recent data, but it cannot be placed or inserted in the middle of existing data in storage system 100. Data may be added or appended in any amount, and data may be added over a time period with no time limit (or a relatively long time limit) Therefore, aspects of the invention are configured to receive data writes to log store 200 in variable lengths and/or over time.

In some cases, data are written to a log store, such as log store 200, using chunks of data of a minimum size, such as four kilobytes, while combining data across a certain amount of writes in order to optimize the size of data written at one time. Data can be delayed and/or combined in a buffer or by other devices or processes in order to optimize write operations. For example, waiting for more write operations to accumulate can provide more options for aligning the data into certain block sizes (while wasting less space), but, combining or grouping more write operations can add to the complexity of the write operations or the data storage in log store 200. The amount of data not written sequentially, or mainly sequentially, can be a trade-off that optimizes write-block sizes while sacrificing some aspects of writing and/or reading data quickly, such as more or purely sequentially.

Storage system 100 can tolerate some failures, as described below in one example. A log store 200 can recreate or reconstruct its state in some cases, for example based on data written to an extent store associated with one or more storage devices, such as storage device 122. If data is recoverable, log store 200 can verify the data, and log store 200 can operate around a failure or corruption in some cases. Log store 200 can revert to and verify stored data in log store 200 at the time of a corruption, or afterwards, if it can be recovered, and continue to work around any corruption in or due to any storage devices associated with storage system 100. In some cases, the most amount of data possible is recovered and/or processed by log store 200 as necessary to function despite a failure, for example through a combination of continued operation and restoration based on the saved data.

A single write operation may fail in a storage system, such as storage system 100. In aspects, a recovery procedure can occur. A failed write can be detected by storage system 100, for example by a controller or manager 110, or as reported by the system. A log store 200, for example, can be reverted to its size before a failed write. In some aspects, an attempt is made to modify a file size to a time prior to the failed write, and the failure is reported to a controller in log store 200. A controller of log store 200, for example controller 112, can cause a new log store 200 to be generated in storage system 100, which may be associated with a different extent store in storage system 100 that is associated with one or more storage devices, such as storage device 124. One or more failed write operations are performed again in the new log store 200, in aspects, which can hide failures from users of a system.

As described above, data received by log store 200 is generally stored sequentially. Log store 200 can generate instances of data in a file format such as that shown in FIG. 2. Instances of data in log store 200 can be written one operation at a time (e.g., data is first-in, first-stored) unless an optimization in storage system 100 (e.g., the size of one or more data blocks to be written) justifies accumulating more than one write function in storage system 100 before writing instances of log store 200 to an extent store associated with one or more storage devices, which is referred to as batching writes together. When a log store, such as log store 200, is full of data or reaches a certain size or space limit or an object limit, log store 200 can be sealed so that no additional data can be written to log store 200. In some cases, a log store is considered full when a cuckoo hash fails to insert data into log store 200, or when a predetermined size is reached (such as a value between one and twenty gigabytes), or when another signal is received by storage system 200 indicating a log store is full. In some cases, a log store 200 is written to an extent store associated with a storage device, such as storage device 122, and a limit is reached when a storage device reaches a certain size or space or object limit Data in log store 200 (or in other data stores in storage system 100) is not deleted during write operations to log store 200. As discussed above, write operations are append-only and substantially (or completely) sequential, and no data is deleted during writes to a log store, such as log store 200. Instead, a delete operation can be recorded as a delete operation without a delete operation taking place at the time. At the time of deletion, the data may or may not reside in the log store 200. However, the delete record will ensure that, when other data structures such as the hash store 300 or journal 400 are mutated, the data associated with the delete operation will be deleted or not written. When log store 200 is full and/or sealed, information about delete operations is contained or noted in log store 200, and the delete operations can be acted upon when data in log store 200 is converted or transformed to a hash store, such as hash store 300, discussed below.

Hash Store

Figure 3:
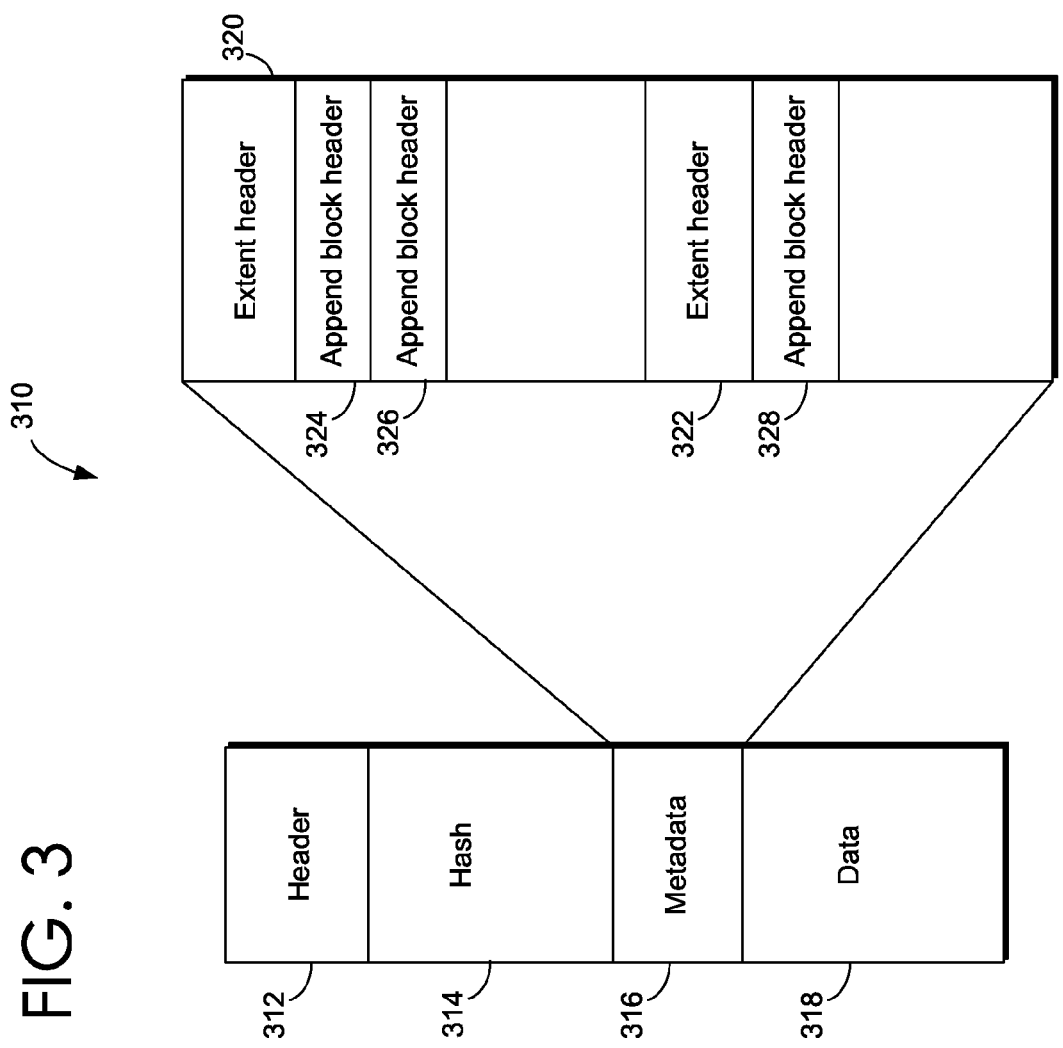
FIG. 3 is a diagram of aspects of hash store of a storage system according to an aspect.

Data in log store 200 can be transformed or copied from log store 200 to a hash store 300, shown in FIG. 3, which includes a representation 310 of an aspect of hash store 300. A log store, such as log store 200, is converted into a hash store, such as hash store 300, in some cases by generating instances of hash store 300 based on data in log store 200. Hash store 300 uses an immutable data structure in aspects. Multiple, individual "hash stores" (or hash tables or maps including slots that can identify identifiers of data) are generated in hash store 300, referred to as the "hash store," in aspects. Each hash store in hash store 300 can be an in-memory optimization of data copied from log store 200. Instances of hash store 300 can be written to an extent store that is associated with on or more storage devices, in some cases the same store device, such as store device 122, associated with instances of log store 200. In some cases, this includes rewriting data in one or more extent stores associated with storage system 100. The hash store 300 uses less memory to track data than the log store, since the hash store can be laid out in a "hash order" in one or more storage devices associated with storage system 100, such as storage device 124, which can be flash storage.

When data is transferred or copied from log store 200 to hash store 300, the footprint of the data in file system 100 can be reduced. The changes, updates and delete operations that were recorded or noted in log store 200 can be acted on, for example by recording or executing delete operations, ins some cases by not writing data associated with delete operation to hash store 300. The size and/or pattern of data in a hash store can be optimized when data is copied from log store 200. Later edits or deletions of data that has been copied to a hash store, such as hash store 300, are not made to the hash store once it is written, in some cases. Instead, these edits or deletions accumulate in the log store 200. At some point, many hash stores accumulate, requiring that the hash store 300 be compacted to reduce duplicate copies of data. During compaction of one or more hash stores 300 to a journal store 400, these changes can be made.

As described above, data in log store 200 is written sequentially including edits and indicators of deletions, which can be acted on as part of converting log store 200 to hash store 300. Additionally, data in log store 200 can be rewritten as instances of data in hash store 300 that optimize the amount of data in each hash store (and minimize the amount of empty or wasted space in one or more extent stores associated with storage system 100), by grouping data to optimize the size of data chunks stored together and due to working with several portions of data (in log store 200) at one time. In an example, each hash store has a predetermined size of a certain number of blocks used in a cuckoo hash, such as 100,000 blocks. Each piece of data may have a key, such as an identifier (e.g., a globally unique identifier or GUID) that is, for example, 128 or 256 bits long. Each slot in a hash store can include a key corresponding to a location of the in-memory data.

Hash store 300 illustrates an exemplary file format of hash store 300. Hash store 300 includes instances of data with header 312, hash 314, metadata 316, and data portion 318. In one example, header 312 is relatively small, such as a couple bytes of data, and hash 314 is a hash comprising insert O(1) and read O(1), such as a hopscotch hash or a cuckoo hash. Hash store 300 can be written to an extent store in increments the size of, or close to, erase blocks. Hash store 300 can be associated with one or more extent stores associated with storage system 100. By pushing data to an extent store in chunks the size of blocks, nonvolatile memory (such as storage device 124) associated with an extent store will not cause re-ordering of data stored by hash store 300.

In aspects, log store 200 is configured to grow or receive appends to the data, and it can store an unknown number of items or amount of data. On the other hand, data stored in hash store 300 has a certain size and structure; a hash store can use a base offset value in memory to access data. Metadata 316, as shown in the aspect in FIG. 3, includes one or more block or extent headers 320, 322 that can identify data blocks, and append-block headers (e.g., append-block headers 324, 326, 328). In aspects, multiple instances of hash store 300 exist (or hash store 300 can include multiple hash stores), written to one or more extent stores, which can be associated with one or more storage devices, such as storage device 124 (while one or more other storage devices, such as storage devices 122, 126 are associated one or more other extent stores used in association with log store 200 and/or journal store 400).

The hash store 300 maintains data in an immutable data structure. Like log store 200, hash store 300 can utilize a hash, and an in-memory component can be a hash, such as a cuckoo hash or other hash (as shown at hash 314 in FIG. 3). In aspects, the hash store in-memory is capable of creating one or more data block or extent identifiers, such as extent header 320, which can point to locations of specific data in the data portion 318 of the hash store 300. An aspect of storage system 100 is configured so the metadata 316 can be used to read information or content from hash store 300.

In an example, extent header 320 is associated with a first extent or data block, while second extent header 322 is associated with a second extent or data block. Append-block header 324 and append-block header 326 represent a first append-block header and a second append-block header, respectively, associated with the first extent. Append-block header 328 represents a first append-block header associated with the second extent. The extent headers and append-block headers in FIG. 3 are representative of one or more headers that can be used in aspects of a hash store (e.g., hash store 300) of storage system 100. The file format shown for hash store 300 is an example, and several headers (as many as necessary for the data in a hash store) can be used.

In one aspect, the representation 310 of an aspect of hash store 300 shows what is written to an extent store, for example an extent store associated with file system 100, which can be associated with a disk or storage device. Hash 314 can be in a format that is quickly accessed, and hash 314 can be used if storage system 100 needs to recreate hash 314 in memory, for example when a computing system or devices are restarted. In some cases, a hash store 300 includes less data in memory than a log store 200, because only hash 314 of hash store 300 is stored in memory. In this aspect, metadata 316 is written to an extent store. A read operation can be carried out by finding the requested information in the hash store 300 in memory, which can provide the offset to an appropriate extent header (e.g., extent header 322), and reading the extent header 322 from the extent store. Extent header 322 can indicate how many append block headers exist (of a well-known constant size), and all of the append block headers (e.g., 324, 326) can be read. The append block headers can indicate offsets read from a data section 318.

Journal Store

Figure 4:
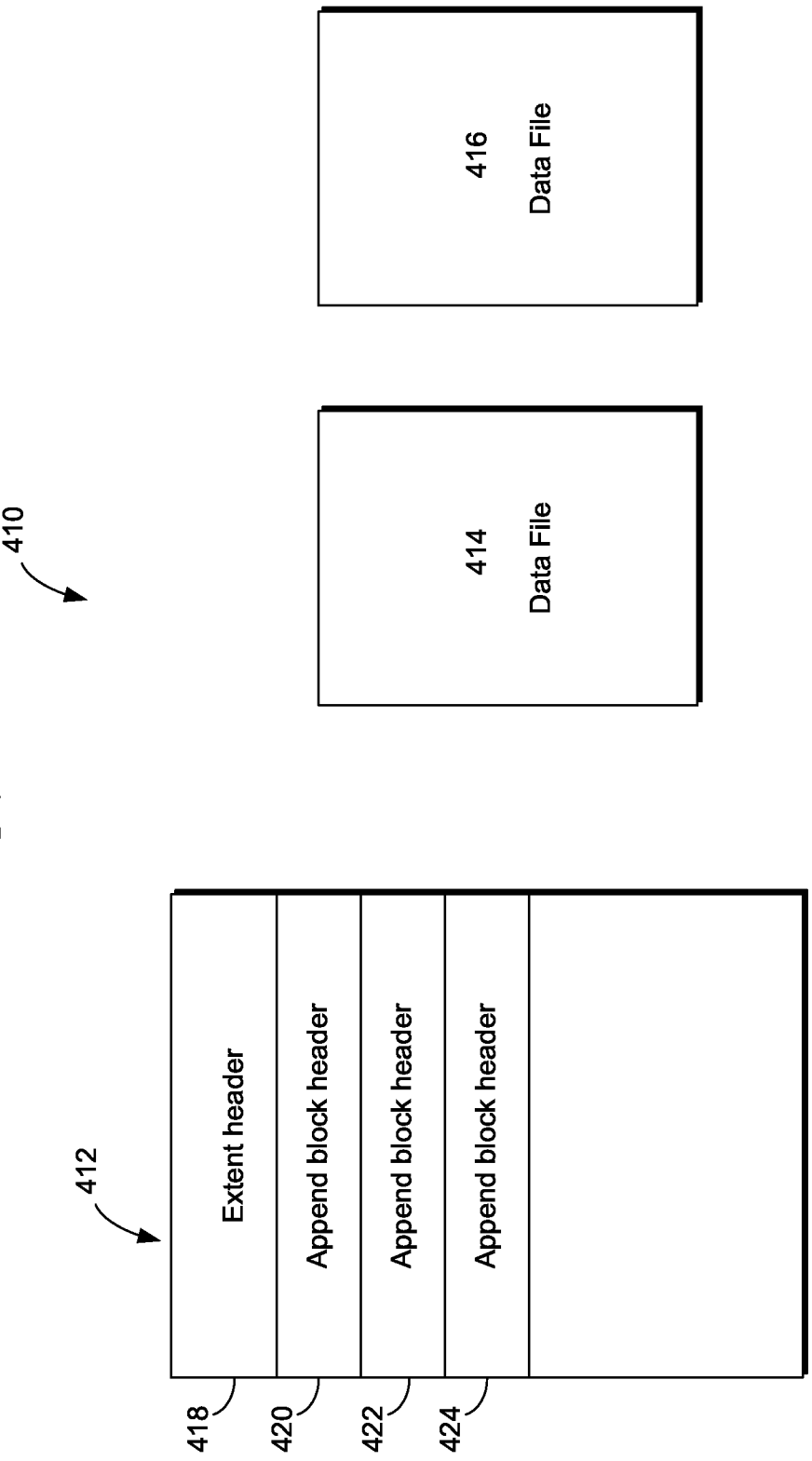
FIG. 4 is a diagram of aspects of journal store of a storage system according to an aspect.

As described with respect to an aspect shown in FIG. 4, storage system 100 includes journal store 400, shown by a representation 410 of an aspect of journal store 400. Content from hash store 300 can be copied or rewritten as content in journal store 400. Journal store 400 is associated with one or more extent stores in storage system 100, which can be associated with one or more storage devices, such as storage device 126, in aspects. Journal store 400 is used to keep older data (sometimes referred to as cold data) as it ages out of the other data stores. For example, hash store 300 can be associated with an extent store, which is associated with the same storage device (e.g., storage device 124) associated with journal store 400, in aspect, or one or more other storage devices. Journal store 400 can include multiple journal stores 400. One or more journal stores 400 can be associated with one or more extent stores in file system 100, which can be associated with one or more storage devices. Journal store 400 is the final destination or resting place of data that has not been deleted in storage system 100, in an example described here. For example, a predetermined amount of hash stores in hash store 300 (accumulated over time as data is written to log store 200 then converted to hash store 300) can reach an amount, or an amount of data, which causes manager 110 to direct the merging of hash stores 300 with another level of data storage, in this case journal store 400.

Journal store 400 stores information in files, such as two classes of files: one or more index files and one or more data or content files (for example index file 412 and data files 414, 416, as shown in FIG. 4). Several instances of data files, such as representative data files 414, 416, can exist in journal store 400. Index files, such as index file 412, contain the metadata describing the data files. The exemplary representation of an index file 412 in FIG. 4 includes a first extent header 418 associated with a first append-block header 420, a second append-block header 422, and a third append-block header 424. An in-memory aspect of journal store 400, in an aspect, finds the location of extent or data block metadata in an index file, such as index file 412. In one example, journal store 400 uses hashing, such as linear hashing with chaining, as a quick look-up to find the location of extent or block metadata. An index file, for example index file 412, contains all of the extent and append block metadata with offsets indicating or identifying where the corresponding data is stored in data files, such as data file 414. Index file 412 can be an in-memory object that points to objects in data file 414. In the example shown, append-block headers 420, 422, 424 are associated with extend header 418, each identifying locations of data in data files 414, 416.

In journal store 400, index file 412 can be updated independently of one or more data files 414, 416. For example, when a data file 414 reaches a maximum size, a new data file 416 is created, and index file 412 can be updated, or index file 412 can be updated based on changes to one or more of multiple data files 414, 416. Separately, journal store 400 can compact or re-compact itself, for example to remove deleted or unnecessary blocks or extents in a journal store 400. A stream of write operations to a portion of data can span one or more data stores 200, 300, 400, in some cases. For example, a user causes a program or application to provide write operations to be implemented by storage system 100. A user causes a first write operation to a portion of data at a first point in time, and the data associated with the first write operation is written to log store 200, then copied to a hash store in hash store 300, and copied to journal store 400, for example, as determined by storage system 100. This movement between data stores can indicate that the data has not been updated over an interval, such as a minimum period of time. At a second point in time, the user causes a subsequent write operation associated with the first write operation, such as a stream of write operations or an edit to the first portion of data, which is added to log store 200 using append-only operations, in this example. A stream of data would exist or be present in more than one data store (e.g., log store 200, journal store 400), in this example. Storage system 100 is configured to read a data stream including data in journal store 400 and log store 200, appearing to a user or API as a unified storage system.

Compaction

A manager 110, shown in FIG. 1A, can control compaction processes for storage system 100 in aspects. Compaction processes include one or more of the steps, such as steps described in association with exemplary processes in FIGS. 5, 6 and 7. Data stores 200, 300, 400 can be considered to be generations of storage system 100, which can include generational or hierarchical data stores as levels of data storage. Data stores 200, 300, 400 are associated with each other in storage system 100, and can be rewritten as instances hash stores 300 and/or journal stores 400, of through one or more compaction processes, in an aspect.

Manager 110 is a compaction manager, in aspects, and it can include instructions or software for coordinating the conversion of a log store 200 into a hash store 300, merging of one or more hash stores 300 into a journal store 400, and compaction of storage system 100. Compaction can be useful or important when more than one hash store has accumulated, in order to make space available in memory 120 associated with hash store 300 and/or in one or more storage devices associated with storage system 100. Manager 110 can cause the compaction of a journal store 400 into another journal store 400. A single manager 110 acts as the control manager for the entire storage system 100 in aspects. Memory 120 can be distributed or divided among data stores 200, 300, 400, such that each data store includes aspects of memory 120 or individual memory associated with each data store. For example, aspects of data stores described as existing in memory, in some cases, can exist in memory associated with the data store.

In aspects, manager 110 controls policies for the conversion or rewriting (including merging) of data from one data store to a different data store. Mechanisms for conversion or rewriting, or for implementing or carrying out the policies, can be a part of each data store 200, 300, 400 in storage system 100. Manager 110 determines when a log store 200 becomes a hash store 300, as described above. Manager 110 determines or controls a hash store 300 becoming a journal store 400, or one or more hash stores 300 becoming a journal store 400. Manager 110 may also determine when a new or additional data store is created, such as when a second log store 200 begins, and manager 110 may determine when a data store, such as journal store 400 compacts or re-compacts itself. The compaction process(es) cause the removal of deleted data blocks and reduce the memory size or footprint of storage system 100.

For example, data is received at log store 200. Manager 110 can control or command data before and/or after it is received in storage system 100. Log store 200 may fail to insert a new entry into a log store hash, such as a cuckoo hash, or the size of log store 200 may reach a predetermined size. The predetermined size can be pre-set in storage system 100, programmed or set when one or more storage devices are associated with storage system 100, or dynamic over time or based on conditions in storage system 100. As stated above, data stored in a log store 200 can be compacted into data stored in hash store 300.

Manager 110 can take control of log store 200 and allow read operations to be performed but prohibit additional write operations to data stored in log store 200, based on a size or other limit reached by log store 200. A hash store 300 is created from a log store at the direction of, or as configured by, manager 110. Data in log store 200 can be copied or pushed straight to hash store 300, by writing to one or more extent stores associated with the same storage device (e.g., storage device 122) or one or more new or different storage devices. Full buffering in memory 120 can occur during compaction of data stored in log store 200, depending on concerns for performance balanced against a desire to work with entire or complete block-sized chunks of data. Manager 110 can implement optimizations, such as causing hash store 300 to write data to be associated with hash store 300 in chunks the size of blocks or erase blocks, or as close to the size of blocks or erase blocks, as possible over a period of time.

Hash store 300 includes one or more hash stores, such as the exemplary hash store 300 described with respect to FIG. 3 above. When data in a log store 200 has been moved to hash store 300, a footer to a hash store 300 can be written that includes a specific number, such as a magic number, that can be used in the event of a crash to check or confirm data in hash store 300. Manager 110 can generate a magic number and/or write a footer to hash store 300. Additionally, manager 110 checks that data blocks associated storage system 100 have integrity, in aspects, for example by scrubbing one or more storage devices 122, 124, 126 associated with data stores 200, 300 (for example one or more SSDs) for corrupt data blocks or bytes, and if corruption is detected, data can be identified as lost or corrupt locally and a remote copy (or other source providing data redundancy) can be used to replace the data.

When one or more hash stores in hash store 300 reach a predetermined age, they are compacted into a journal (e.g., journal store 400), in an aspect. Manager 110 can cause hash stores to be added to an existing journal store 400, and/or manager 110 can cause a journal store 400 to be created based on one or more hash stores 300, in aspects. When data is added to journal store 400, a new index 412 can be created or updated. In some cases, when journal store 400 contains a certain amount or percentage of data blocks that have been deleted, journal store 400 rewrites itself (at the direction of manager 110 or not). Journal store 400 can rewrite itself when a level of overall free space in one or more extent stores associated with journal store 400 reaches a limit, for example to remove unused data and combine remaining data intelligently.

Rewriting may involve an index file, such as index file 412, and some or all of the data files in a journal store 400, such as data files 414, 416. For example, a rewrite of a journal store 400 data instance may involve a rewrite of index file 412 and data file 414 but not data file 416. A rewrite can be commanded or executed by manager 110 based on the space levels (available or unavailable) in one or more extent stores associated with a journal store 400, or an amount of time or a time constraint, or an amount of delete operations to be performed on data stored in one or more data stores in storage system 100. For example, manager 110 directs compaction of one or more journals, such as journal store 400, into other journals. In aspects, a single data file (e.g., data file 414 in FIG. 4) is re-created (and the previous data file is deleted), which can allow a smaller percentage of space in one or more associated extent stores (associated with one or more storage devices 122, 124, 126) to be occupied by journal store 400, to be reserved or used for compaction.

Figure 5:
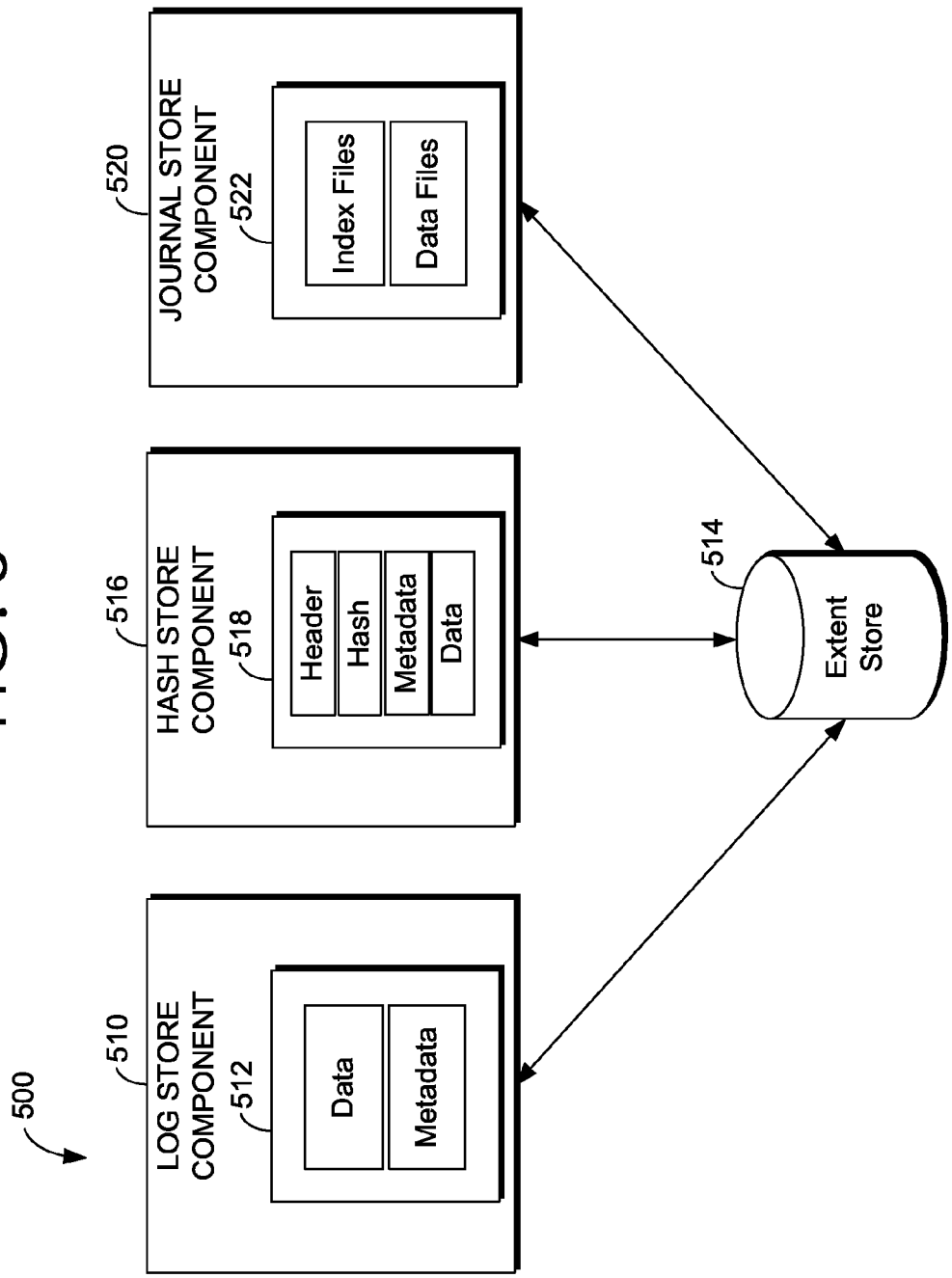
FIG. 5 is a diagram showing aspects of a storage system.

FIG. 5 illustrates an aspect of storage system 100 at 500. FIG. 5 shows a log store component 510, including a representation of an instance 512 of a log store component 510 including data and metadata, which can be written to extent store 514. FIG. 5 also includes a hash store component 516, including a representation of an instance 518 of a hash store component 516, with a header, hash, metadata and data, which can be written to extent store 514. Another exemplary data store is illustrated by a journal store component 520, including a representation of an instance 522 of a journal store component 520 in FIG. 5, including index and data files, which is also capable of being written to extent store 514. As described elsewhere, extent store 514 can be associated with one or more storage devices or containers, such as storage device 122, in storage system 100.

Figure 6:
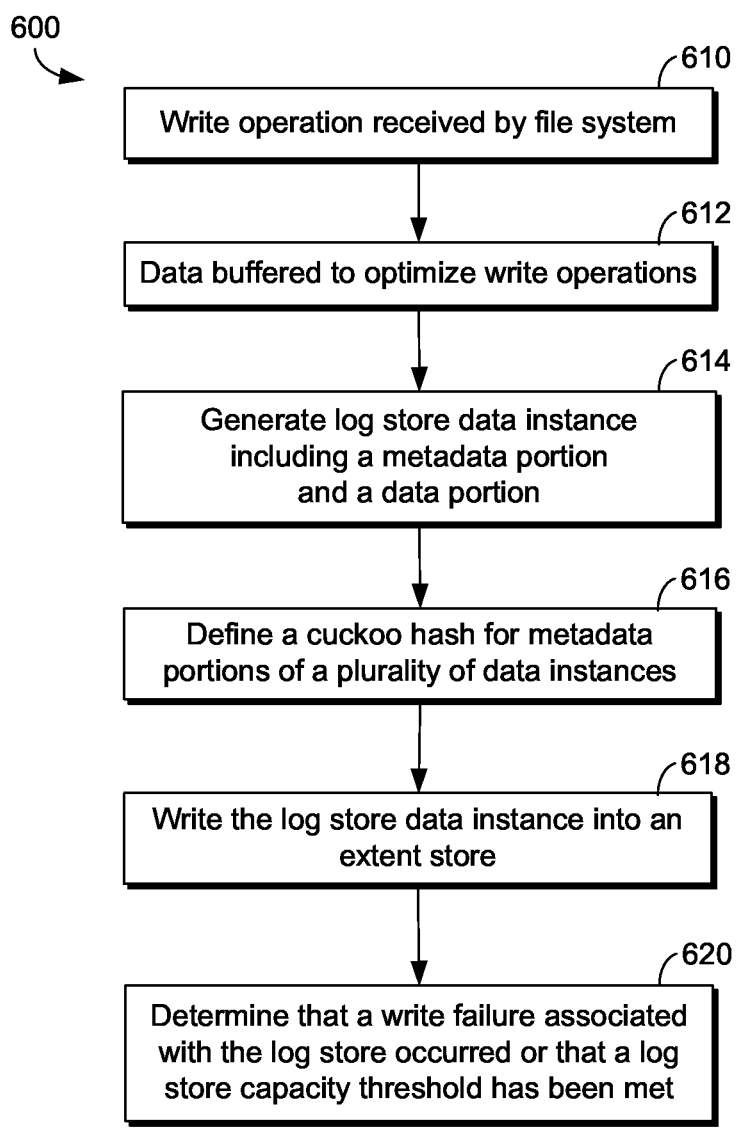
FIG. 6 is a flow diagram showing aspects of a process for a write operation according to an aspect.

FIG. 6 illustrates aspects of the invention at 600. As shown at 610, a user causes a program or application to send a write operation to storage system 100. Data can be buffered, such as in memory associated with log store 200, to optimize write operations and the size of data chunks in log store 200 (at 612). A log store instance is generated at 614, including a metadata portion and a data portion, and a cuckoo hash for metadata portions of one or more log store 200 data instances is defined at 616, and the log store instance is written into an extent store at 618. At 620, it is determined that a write failure with a physical write associated with log store 200 occurred or that a log store capacity threshold has been met.

Figure 7:
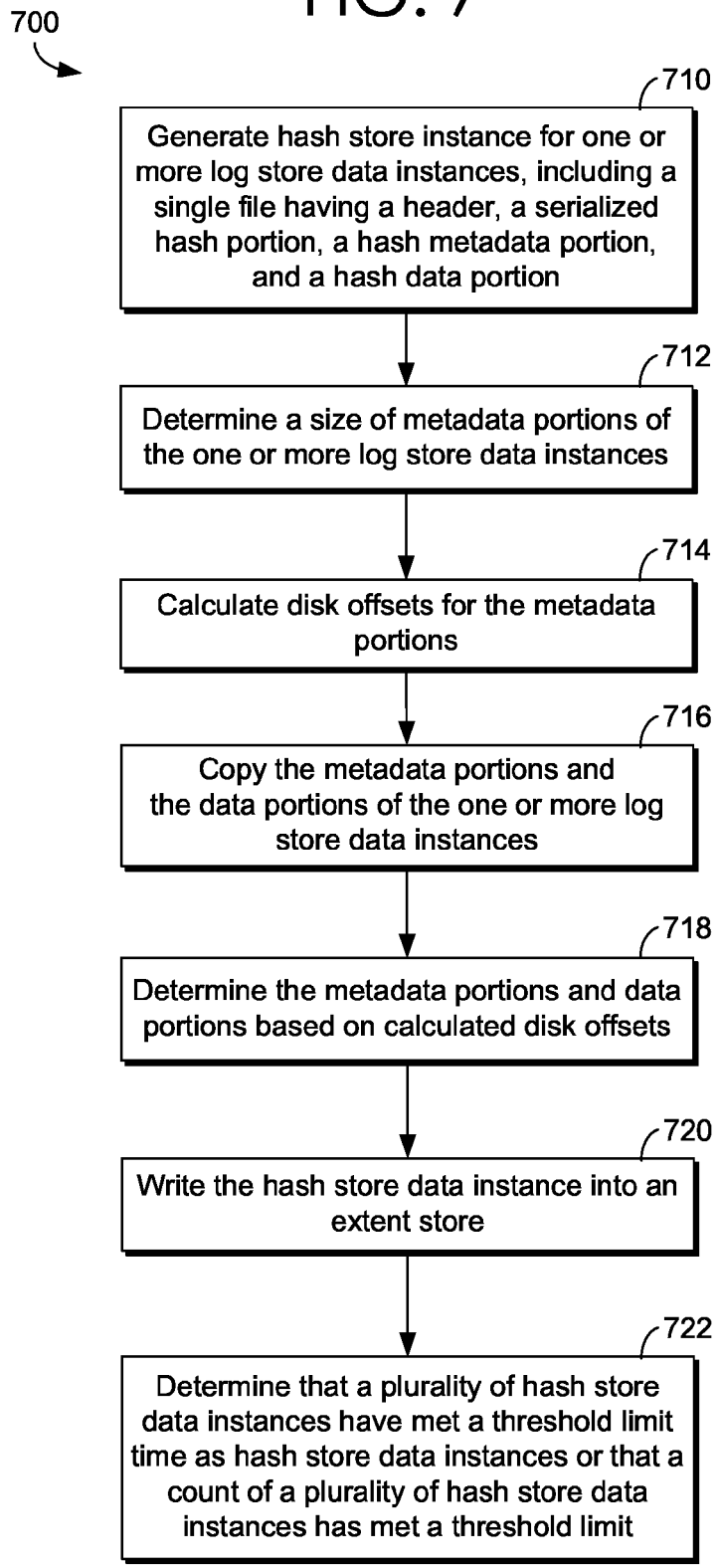
FIG. 7 is a flow diagram showing aspects of a process for storing data according to an aspect.

FIG. 7 illustrates aspects of the invention at 700. As shown at 710, aspects of the invention include generating a hash store 300 instance for one or more log store data instances, including a single file having a header, a hash portion, a hash metadata portion, and a hash data portion. In some cases, after a determination is made as shown at 620, a hash store 300 data instance is generated as shown at 710.

Figure 8:
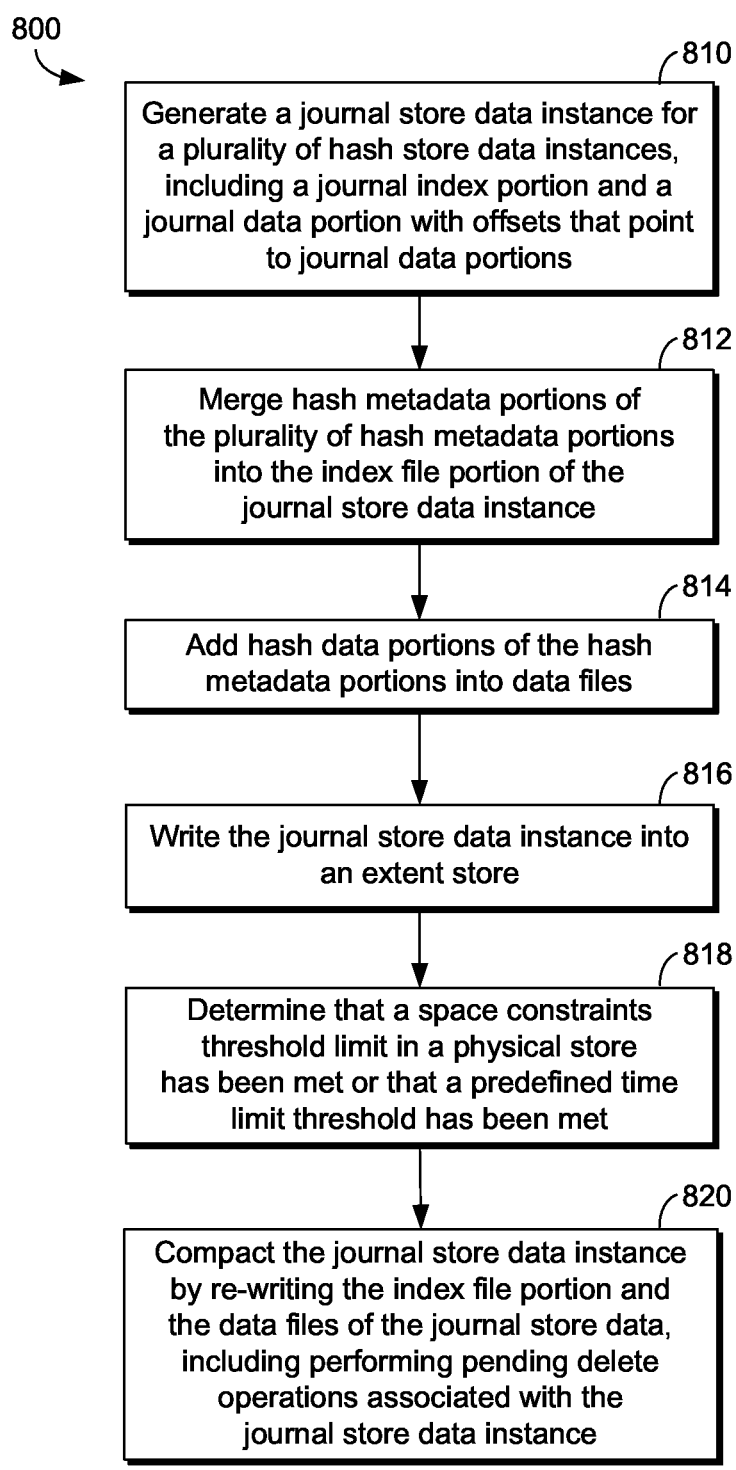
FIG. 8 is a flow diagram showing aspects of a process for storing data according to an aspect.

The size of the metadata portions of several log store data instances is determined at 712, and disk offsets for the metadata portions are calculated at 714. As shown at 716, metadata portions and data portions of the several log store data instances are copied, and, as shown at 718, the metadata portions and data portions based on calculated disk offsets are determined Hash store 300 data instance is written to the extent store, as shown at 720. At 722, it is determined that a plurality of hash store data instances have met a threshold limit time as hash store data instances or that a count of a plurality of hash store data instances has met a threshold limit. For example, it can be determined that one or more hash stores in hash store 300 have reached a predetermined age, or that the number of hash stores exceeds a defined limit, or that a total size of storage taken up by hash stores in hash store 300 has exceeded a limit As shown in FIG. 8, an illustrative aspect 800 of the invention includes, at 810, generating a journal store data instance for a plurality of hash store data instances, including a journal index portion and a journal data portion with offsets that point to journal data portions. Journal store 400 data instance can be generated based on a determination made at 722, in some cases. Aspects also include merging hash metadata portions of a plurality of hash metadata portions into the index file portion of the journal store data instance, as shown at 812, and adding hash data portions of the hash metadata portions into data files, as shown at 814. A journal store 400 data instance is written into an extent store at 816.

As shown at 818 in FIG. 8, it is determined that a space constraints threshold limit in a physical store has been met (such as a limit in one or more storage devices, e.g., storage device 126, associated with one or more data stores, such as journal store 400, in storage system 100) or that a predefined time limit threshold has been met. The journal store data instance can be compacted, as shown in one aspect at 820, by re-writing the index file portion and the data files of the journal store data. Compaction can include performing one or more pending delete operations associated with the journal store data instance, for example by not copying or writing data associated with one or more delete operations.

Exemplary Read Path

An exemplary read path 900 used in aspects of the invention is shown in FIG. 9. Storage system 100 can look for data first in the most-recently written log store 200. Data in log store 200 is likely to include the most recent or up-to-date data, in aspects, such as later edits including deletions to data that is in another data store, such as journal store 400. At 910, a user causes storage system 100 to receive a request to read data in storage system 100. At 912, a block or extent associated with the read request is identified in storage system 100. A manager 110 or other indicators in storage system 100 may be used to determine if the extent is stored by log store 200. If an extent is stored by log store 200, the read function may be able to be completed using only the log store 200, providing a fast response time and making steps 914 through 918 unnecessary.

If a data block or extent is not successfully located as stored by log store 200, one or more hash stores in hash store 300 may be checked next or in parallel with each other, as shown at 914, and once located, the read operation can be completed. In cases where multiple hash stores exist in hash store 300, a read operation may have to look in each of the multiple hash stores for an extent before looking in a journal store 400, which may slow down the read operation (although these reads can be performed in parallel). The hash stores in hash store 300 can be read sequentially or simultaneously, depending on trade-offs and criteria set in storage system 100. For example, it may be slower to read multiple hash stores simultaneously. Since hash stores 300 have a small amount of in-memory metadata, in some cases, read operations are not required to go to or check one or more storage containers associated with file system 100, such as storage device 126, which can be flash, to determine whether data resides in a particular hash store 300.

In some cases, it is preferable to have fewer hash stores in hash store 300 in order to minimize the steps necessary to perform a read operation on storage system 100. At 918, if an extent is not successfully read in a log store or hash store, journal store 400 is checked, and, when the extent is located, it can be read from any data store 200, 300, 400, including the journal store 400 (as shown at 820), or from more than one data store, e.g., a combination of log store 200, hash store 300 and/or journal store 400. Read operations in storage system 100 can be performed in parallel on log store 200, hash store 300 and/or journal store 400, in aspects of the invention.

As described above, one or more APIs can be used to append data, read data, delete data and/or enumerate data. APIs can interact with storage system 100 as a unified storage system, and storage system 100 can use the functionalities described above to perform data storage in response to write operations, including edits and deletions. APIs allow a user to append data to a data block in storage system 100 (when an associated program or application communicates a user request to storage system 100, over bus 118 or otherwise). In an example, a user requests to read a piece of data, for example a request for a piece of data represented as or by a read unit, and through a request the user (or a system or application associated with the user's request) provides an identifier for the data (such as a key value), an offset, and a read-length value for the data. Storage system 100 enables the log store 200, hash store 300 and journal store 400 to be examined or considered for any pieces of data that contain the identifier.

EXAMPLES

In aspects of the storage system 100 described herein, a computer-implemented method for storing data in a multi-tier storage system comprises generating a log store data instance comprising a plurality of data instances, where a data instance comprises a metadata portion and a data portion, and writing the log store data instance into an extent store. The method includes generating a hash store data instance for a one or more log store data instances, where the hash store data instance is a single file having a header, a hash portion, a hash metadata portion, and a hash data portion, and writing the hash store data instance into the extent store. In aspects, the method also includes generating a journal store data instance for a plurality of hash store data instances, where the journal store data instance is a file format comprising a journal index portion and a journal data portion, the journal index portion comprising a plurality of hash metadata portions having offsets that point to corresponding journal data portions, and writing the journal store data instance into the extent store/

In some cases, writing the log store data instance into an extent store includes defining a cuckoo hash for metadata portions of the plurality of data instances. In aspects, the size of the log store data instance is substantially the size of a block size of a storage device, such as storage device 122, of the log store data instance. In some cases, a hash, such as a cuckoo hash, includes file offsets that point to corresponding hash metadata portions, and the hash metadata portions comprise hash metadata offsets to corresponding hash data portions. Writing the journal store data instance can include appending the journal store data instance to an end of an existing journal store data instance. Writing the log store data instance, the hash store data instance, and the journal store data instance can include writing the log store data instance, the hash store data instance, and the journal store data instance into append blocks in a compressed format in one or more physical storage containers, such as one or more of storage devices 122, 124, 126, wherein the append blocks in compressed format are associated with corresponding logical uncompressed sizes.

In aspects, generating the hash store data instance for one or more log store data instances is based on converting one or more log store data instances to the hash store data instance, which includes determining a size of the metadata portions of the log store data instances, calculating disk offsets for the metadata portions, copying the metadata portions and the data portions of the log store data instances, and writing the metadata portions and data portions based on calculated disk offsets. Generating the hash store data instance also includes examining delete records in the log store data instances and not copying data that has been deleted. In one example, generating the journal store instance is based on merging the plurality of hash store data instances to the journal store data instance, which can include updating the metadata in the journal store instance with information from the hash store data instance metadata portions, and adding hash data portions of the hash metadata portions into data files.

In another example, compacting the journal store data instance is based on re-writing the index file portion and the data files of the journal store data, and compacting the journal store instance includes performing one or more pending delete operations associated with the journal store data instance. In some cases, the extent store includes one or more solid state drives as storage devices, such as storage devices 122, 124, 126.

In another aspect, computer storage media include computer-executable instructions that cause one or more processors to perform a method for storing data in a multi-tier storage system. This method includes converting a log store data instance to a hash store data instance, where the log store data instance includes a metadata portion and a data portion, and where converting the log store data instance includes determining a size of the metadata portion of the log store data instance, calculating disk offsets for the metadata portion, copying the metadata portion and the data portion, and writing the metadata portion and the data portion based on calculated disk offsets. The method can also include merging a plurality of hash store data instances to a journal store data instance, where a hash store data instance includes a single file having a header, a hash, a hash metadata portion, and a hash data portion. Merging the plurality of hash store data instances can include merging hash metadata portions of the plurality of hash metadata instances into an index file portion of the journal store data instance and adding hash data portions of the plurality of hash metadata instances into data files.

In another aspect, the method includes compacting the journal store data instance based on re-writing the index file portion and the data files of the journal store data. In some cases, converting the log store data instance to a hash store data instance is triggered based on determining that a log store capacity threshold has been met or determining an occurrence of a write failure associated with a physical write to a storage device associated with log store 200. Merging the hash store data instance to the journal store data instance can be triggered based on determining that a plurality of hash store data instances have met a threshold limit time as hash store data instances, determining that a count of a plurality of hash store data instances has met a threshold limit, or determining that a threshold amount of delete keys are associated with the hash store data instances. In some cases, compacting the journal store data instance is triggered based on determining a space constraints threshold limit in a physical store (such as one or more storage device 126 associated with journal store 400) has been met or determining a predefined time limit threshold that triggers compacting has been met.

An exemplary aspect of the invention includes a system for storing data in a multi-tier storage system, including a processor and a memory configured for providing computer program instructions to the processor, and a log store component (e.g., log store component in FIG. 5) configured for generating a log store data instance comprising a plurality of data instances, where each a data instance comprises at metadata portion and a data portion, and writing the log store data instance into an extent store, for example as shown by log store data instance 512 and extent store 514 in FIG. 5. A system can also include a hash store component configured for generating a hash store data instance for one or more log store data instances, where the hash store data instance (e.g., hash store data instance 518) is a single file having a header, a hash portion (such as a cuckoo hash portion or other hash with insert 0(1) and read 0(1)), a hash metadata portion, and a hash data portion, and writing the hash store data instance into extent store 514. The hash store component can be generated based on a first condition associated with the log store component. A system can include a journal store component configured for generating a journal store data instance (e.g., journal store data instance 522) for a plurality of hash store data instances, where the journal store data instance is a file format comprising an journal index portion and a journal data portion, the journal index portion including a plurality of hash metadata portions having offsets that point to corresponding journal data portions, and writing the journal store data instance into extent store 514. Each data store component can be associated with a separate extent store and/or with a separate storage device or container that is associated with an extent store 514.

They system can include an extent store component configured for storing the log store data instance, the hash store data instance, and the journal store data instance comprises writing the log store data instance as append blocks in a compressed format in one or more physical storage containers, where the append blocks in compressed format are associated with corresponding logical uncompressed sizes. The system can also include a compaction component, where generating a hash store data instance for one or more log store data instances is based on the compaction component converting the one or more log store data instances to the hash store data instance, where converting the one or more log store data instances comprises determining a size of the metadata portions of the one or more log store data instances, calculating disk offsets for the metadata portions, copying the metadata portions and the data portions of the one or more log store data instances, and writing the metadata portions and data portions based on calculated disk offsets.

The system can include generating the journal store instance is based on the compaction component merging the plurality of hash store data instances to the journal store data instance, where merging the plurality of hash store data instances includes merging hash metadata portions of the plurality of hash metadata portions into the index file portion of the journal store data instance and adding hash data portions of the hash metadata portions into data files. In aspects, the compaction component compacts the journal store data instance based on a re-writing the journal index portion and journal data portions.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A computer-implemented method for storing data in a multi-tier storage system, the method comprising:
generating a log store data instance comprising a plurality of data instances, wherein a data instance comprises a metadata portion and a data portion;
writing the log store data instance into an extent store;
generating a hash store data instance for one or more log store data instances, wherein the hash store data instance is a single file having a header, a hash portion, a hash metadata portion, and a hash data portion, wherein generating the hash store data instance for the one or more log store data instances is based on converting the one or more log store data instances to the hash store data instance, wherein converting the one or more log store data instances comprises:
(a) determining a size of the metadata portions of the one or more log store data instances;
(b) calculating disk offsets for the metadata portions;
(c) copying the metadata portions and the data portions of the one or more log store data instances; and
(d) writing the metadata portions and data portions based on calculated disk offsets;
writing the hash store data instance into the extent store;
merging a plurality of hash store data instances to a journal store data instance, wherein the journal store data instance is a file format comprising a journal index portion and a journal data portion, the journal index portion comprising a plurality of hash metadata portions having offsets that point to corresponding journal data portions;
merging hash metadata portions of the plurality of hash metadata instances into an index file portion of the journal store data instance;
adding hash data portions of the plurality of hash metadata instances into data files; and
writing the journal store data instance into the extent store.

2. The computer-implemented method of claim 1, wherein writing the log store data instance into an extent store comprises defining a hash for metadata portions of the plurality of data instances, wherein the hash is a cuckoo hash.

3. The computer-implemented method of claim 1, wherein a size of the log store data instance is substantially proportional to the size of a block size of a storage device associated with the log store data instance.

4. The computer-implemented method of claim 1, wherein the hash portion comprises file offsets that point to corresponding hash metadata portions, and wherein the hash metadata portions comprise hash metadata offsets to corresponding hash data portions.

5. The computer-implemented method of claim 1, wherein writing the journal store data instance comprises appending the journal store data instance to an end of an existing journal store data instance.

6. The computer-implemented method of claim 1, wherein writing the log store data instance, the hash store data instance, and the journal store data instance comprises writing the log store data instance, the hash store data instance, and the journal store data instance into append blocks in a compressed format in one or more physical storage containers, wherein the append blocks in compressed format are associated with corresponding logical uncompressed sizes.

7. The media of claim 1, wherein generating the journal store data instance is based on:
appending the plurality of hash store data instances to the journal store data instance, wherein appending the plurality of hash store data instances comprises:
merging hash metadata portions of the plurality of hash metadata portions into the index file portion of the journal store data instance; and
adding hash data portions of the hash metadata portions into data files.

8. The media of claim 7, further comprising:
compacting the journal store data instance based on re-writing the index file portion and the data files of the journal store data, wherein compacting the journal store data instance includes performing one or more pending delete operations associated with the journal store data instance.

9. The media of claim 1, wherein the extent store comprises one or more solid state drives.

10. One or more computer storage media having computer-executable instructions embodied thereon that, when executed, by one or more processors, causes the one or more processors to perform a method for storing data in a multi-tier storage system, the method comprising:
converting a log store data instance to a hash store data instance, the log store data instance comprising a metadata portion and a data portion, wherein converting the log store data instance comprises:
(a) determining a size of the metadata portion of the log store data instance;
(b) calculating disk offsets for the metadata portion;
(c) copying the metadata portion and the data portion; and
(d) writing the metadata portion and the data portion based on calculated disk offsets;
merging a plurality of hash store data instances to a journal store data instance, a hash store data instance comprising a single file having a header, a hash, a hash metadata portion, and a hash data portion, wherein merging the plurality of hash store data instances comprises:
merging hash metadata portions of the plurality of hash metadata instances into an index file portion of the journal store data instance; and
adding hash data portions of the plurality of hash metadata instances into data files.

11. The computer storage media of claim 10, further comprising:
compacting the journal store data instance based on re-writing the index file portion and the data files of the journal store data.

12. The computer storage media of claim 10, wherein converting the log store data instance to a hash store data instance is triggered based on one of the following:
determining that a log store capacity threshold has been met; or
determining an occurrence of a write failure associated with a physical write associated with the log store.

13. The media of claim 10, wherein merging the hash store data instance to the journal store data instance is triggered based on one of the following:
determining that a plurality of hash store data instances have met a threshold limit time as hash store data instances; or determining that a count of a plurality of hash store data instances has met a threshold limit.

14. The media of claim 11, wherein compacting the journal store data instance is triggered based one of the following:
   determining a space constraints threshold limit in a physical store has been met;
   determining a threshold amount of deletes exist; or
   determining a predefined time limit threshold that triggers compacting has been met.

15. A system for storing data in a multi-tier storage system comprising:
   a processor and a memory configured for providing computer program instructions to the processor;
   a log store component configured for:
      generating a log store data instance comprising a plurality of data instances, wherein each data instance comprises at metadata portion and a data portion; and
      writing the log store data instance into an extent store;
   a hash store component configured for:
      generating a hash store data instance for a plurality of log store data instances, wherein the hash store data instance is a single file having a header, a hash portion, a hash metadata portion, and a hash data portion, and wherein the hash store component is generated based on a first condition associated with the log store component wherein generating the hash store data instance for the one or more log store data instances is based on converting the one or more log store data instances to the hash store data instance, wherein converting the one or more log store data instances comprises:
         (a) determining a size of the metadata portions of the one or more log store data instances;
         (b) calculating disk offsets for the metadata portions;
         (c) copying the metadata portions and the data portions of the one or more log store data instances; and
         (d) writing the metadata portions and data portions based on calculated disk offsets,
      and, writing the hash store data instance into the extent store;
   a journal store component configured for:
      generating a journal store data instance for a plurality of hash store data instances, wherein the journal store data instance is a file format comprising a journal index portion and a journal data portion, the journal index portion comprising a plurality of hash metadata portions having offsets that point to corresponding journal data portions;
      merging hash metadata portions of the plurality of hash metadata instances into an index file portion of the journal store data instance;
      adding hash data portions of the plurality of hash metadata instances into data files; and
      writing the journal store data instance into the extent store.

16. The system of claim 15, further comprising:
   an extent store component configured for:
   storing the log store data instance, the hash store data instance, and the journal store data instance comprises writing the log store data instance as append blocks in a compressed format in one or more physical storage containers, wherein the append blocks in compressed format are associated with corresponding logical uncompressed sizes.

17. The system of claim 15, wherein generating the journal store data instance is based on the compaction component:
   merging the plurality of hash store data instances to the journal store data instance, wherein merging the plurality of hash store data instances comprises:
   updating hash metadata portions of the plurality of hash metadata portions into the index file portion of the journal store data instance; and
   adding hash data portions of the hash metadata portions into data files.

18. The system of claim 17, wherein the compaction component compacts the journal store data instance based on re-writing the journal index portion and journal data portions.

* * * * *